Oct. 20, 1925.

W. ROBERTSON

GASKET FOR INTERNAL COMBUSTION ENGINES

Filed Feb. 4, 1925

1,557,775

INVENTOR.
William Robertson.
By William C. Linton
Atty.

Patented Oct. 20, 1925.

1,557,775

UNITED STATES PATENT OFFICE.

WILLIAM ROBERTSON, OF CAMBUSLANG, SCOTLAND.

GASKET FOR INTERNAL-COMBUSTION ENGINES.

Application filed February 4, 1925. Serial No. 6,849.

*To all whom it may concern:*

Be it known that I, WILLIAM ROBERTSON, a subject of the King of Great Britain and Ireland and the Isle of Man, and a resident of Cambuslang, Lanarkshire, Scotland, have invented new and useful Gaskets for Internal-Combustion Engines, of which the following is a specification.

This invention has reference to improvements in and relating to gaskets for internal combustion engines and the like.

In certain types of internal combustion engines particularly for use in motor cars and the like, difficulty is experienced in fitting the inlet and exhaust manifold to the cylinder with the gasket packing properly sandwiched in position. Various forms of gaskets have been designed to overcome this difficulty and those forms usually have consisted in forming the gasket sectional but it has been found in practice that it is difficult to retain the sectional gaskets properly in position till the manifold is fitted with the result that considerable time is occupied in fitting the manifold to the cylinder.

The object of this invention is to construct the gasket cheaply and simply so that the manifold may be fitted to the cylinder speedily and properly with a minimum amount of trouble.

According to this invention the gasket comprises two metallic plates (preferably copper plates) secured together with a sheet of asbestos or the like sandwiched between same and provided with openings corresponding to the ports of the cylinder and manifold. These openings are formed with projecting cylindrical tapered flanges so that the fitting of the gasket is greatly facilitated.

Figure 1:
Figure 2:
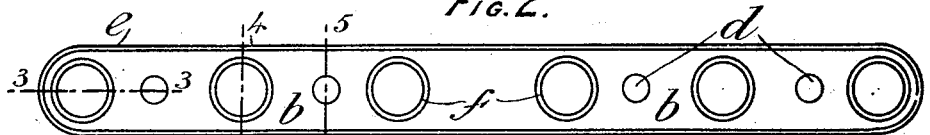
Figure 3:
Figures 4, 5:
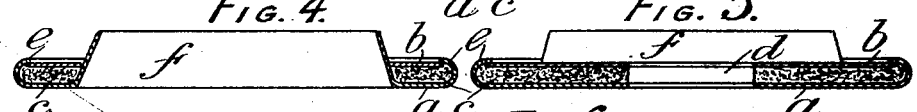

In order that my said invention and the manner of carrying the same into effect or practice may be properly understood I have hereunto appended one sheet of explanatory drawings in which Figure 1 is an elevation and Figure 2 is a plan view of a gasket for internal combustion engines constructed according to this invention. Figures 3, 4 and 5 are sections taken respectively on the lines 3—3, 4—4, and 5—5, in Figure 2.

Figure 6:
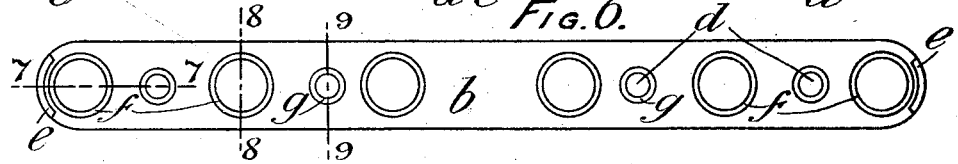
Figure 7:
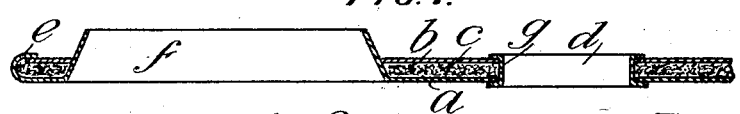
Figures 8, 9:

Figure 6 is a plan view of a slightly modified construction of gasket and Figures 7, 8 and 9 are sections taken respectively, on the lines 7—7, 8—8, and 9—9 in Figure 6.

Figures 3, 4, 5, 7, 8, and 9 are shown enlarged so as to render same more clear.

Figure 10:
Figure 11:
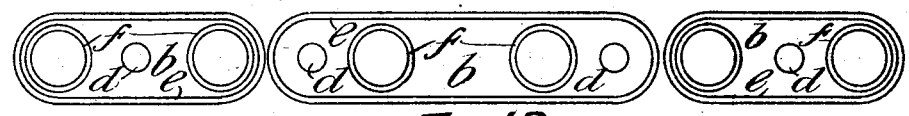
Figure 12:

Figures 10, 11, and 12 comprise plan views of three further modified constructions of gaskets.

Referring to these drawings:—

In carrying this invention into effect or practice and as illustrated by Figures 1 to 5 the gasket comprises two metallic, preferably copper plates $a$ and $b$ which are secured together with a sheet of asbestos or the like $c$ sandwiched between same. These plates $a$ and $b$ and the asbestos packing $c$ between same are pierced with holes $d$ preferably four holes, through which the securing bolts or studs (not shown) for securing the manifold may be passed; these holes $d$ being spaced apart so that the bolts or studs register with same. The two plates $a$ and $b$ are secured together with the packing $c$ sandwiched between them by means of a flange $e$ formed on the plate $a$ all round same, bent over and clenched to the outer surface of the other plate $b$.

The plate $b$ and the asbestos packing $c$ are pierced with holes or ports preferably six holes spaced apart, so that they register with the ports of the cylinder and manifold. The plate $a$ is also pierced with holes the centers of which are the same as the centers of the holes in the plate $b$ and asbestos packing $c$ but these holes in the plate $a$ are smaller in diameter than the holes in the plate $b$ and the asbestos packing $c$. The metal of the plate $a$ surrounding the holes is bent at approximately or nearly right angles through the holes in the plate $b$ and the asbestos packing $c$ and forms a wall or flange $f$ which is upstanding or projecting beyond the outer surface of the plate $b$ and is within the holes in the said plate and asbestos packing.

The wall $f$ is of tapered formation, that is, the diameter of the projecting end of the wall $f$ would be slightly less than the diameter at the other end of the wall.

The fitting of this gasket is greatly facilitated by means of this projecting tapered wall $f$ which would fit into the ports in the manifold and allow sufficient movement and adjustment to enable the manifold to be fitted with little trouble.

According to the slightly modified arrangement illustrated by Figures 6 to 9 the flange $e$ instead of extending all round the plate $a$ is provided at the ends of the plate $a$ only and is bent over and clenched to the outer surface of the plate $b$ while eyelets or the like $g$ are fitted into the bolt holes $d$ and clenched so that the plates $a$ and $b$ with the packing $c$ sandwiched between same are secured together firmly.

The modification illustrated by Figure 10 is similar in construction to that illustrated by Figures 1 to 5 but in this case the gasket is formed in two parts each of which comprises two bolt holes $d$ and three holes with the projecting walls $f$.

The modification illustrated by Figure 11 is also similar in construction to that illustrated by Figures 1 to 5 but in this case the gasket is formed in three parts each of which is provided with two holes with the walls $f$. Two of these parts have one bolt hole $d$ each and the other part has two bolt holes $d$.

If desired and as illustrated by Figure 12 the side edges $h$ of the gasket may be curved inwardly between the ports or holes provided with the walls $f$ so that the shape or configuration is such that there is a saving in the amount of material used.

I claim:—

1. A gasket for internal combustion engines comprising a pair of metallic plates and a sheet of packing material sandwiched therebetween, said plates and packing having aligning openings therein, of truncated conical shaped flanges formed with one of said plates and projecting snugly through the openings of said packing and of the other said plate, substantially as and for the purpose specified.

2. A gasket of the character described comprising an outer plate having openings therein, flanges formed with said plate and encircling said openings, an inner plate, a sheet of packing retained between said plates, said inner plate and packing having aligning openings therein adapted to register with and of greater diameter than the openings of said outer plate, and said flanges projecting snugly through the openings within said inner plate and packing.

3. A gasket for internal combustion engines comprising an outer plate having openings therein adapted to register with all of the ports of the engine, a flange for each opening having tapered formation and projecting at substantially right angles to said plate whereby they may be seated within the ports of the engine, an inner plate, a sheet of packing arranged between said plates, said inner plate and packing having openings therein for the snug reception of said flanges, and means for clampingly connecting said plates together.

4. A gasket for internal combustion engines comprising an outer plate having a series of openings formed therein, annular tapering flanges formed integral with said plate adjacent said openings, a packing received upon said outer plate, an inner plate engaged over said packing, the marginal portions of said outer plate being extended beyond the marginal portions of said inner plate and curved upon themselves and clampingly engaged over the adjacent marginal portions of such inner plate whereby to compress the same upon the packing, the inner plate and sheet of packing having openings therein for snugly receiving the extended portions of the annular tapering flanges therethrough, and means engaged in the intermediate portions of the several plates for further clampingly engaging the same upon the sheet of packing.

WILLIAM ROBERTSON.